United States Patent
Zhang et al.

(10) Patent No.: US 10,015,832 B2
(45) Date of Patent: *Jul. 3, 2018

(54) SYSTEM AND METHOD FOR COMMUNICATIONS IN COMMUNICATIONS SYSTEMS WITH RELAY NODES

(71) Applicant: Huawei Technologies Co., Ltd., Shenzhen (CN)

(72) Inventors: Hang Zhang, Nepean (CA); Yunsong Yang, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/935,086

(22) Filed: Nov. 6, 2015

(65) Prior Publication Data

US 2016/0066363 A1 Mar. 3, 2016

Related U.S. Application Data

(63) Continuation of application No. 12/964,234, filed on Dec. 9, 2010, now Pat. No. 9,504,079.

(Continued)

(51) Int. Cl.
*H04L 12/28* (2006.01)
*H04W 76/02* (2009.01)
(Continued)

(52) U.S. Cl.
CPC ......... *H04W 76/025* (2013.01); *H04W 12/08* (2013.01); *H04W 72/08* (2013.01);
(Continued)

(58) Field of Classification Search
CPC . H04W 76/022; H04W 76/025; H04W 12/08; H04W 72/08; H04B 7/2606
See application file for complete search history.

(56) References Cited

U.S. PATENT DOCUMENTS

| 8,989,004 | B2 | 3/2015 | Zhang et al. | |
| 2002/0037712 | A1* | 3/2002 | Shin | H04W 76/022 455/414.1 |

(Continued)

FOREIGN PATENT DOCUMENTS

| CN | 101292558 A | 10/2008 |
| CN | 101507333 A | 8/2009 |

(Continued)

OTHER PUBLICATIONS

Huawei et al.: "Relay Architecture in RAN3 Baseline Paper," 3GPP TSG RAN WG3 #65, R3-091775, Aug. 24-28, 2009, 5 pages, Shenzhen, China.

(Continued)

*Primary Examiner* — Khaled Kassim
*Assistant Examiner* — Syed S Ali
(74) *Attorney, Agent, or Firm* — Slater Matsil, LLP (57) ABSTRACT

A system and method for communications in communications systems with relay nodes are provided. A communications controller includes a communications control unit, a bearer control unit coupled to the communications control unit, and a mapping unit coupled to the bearer control unit. The communications control unit manages resources and schedules transmission opportunities, the bearer control unit manages radio bearers for relay nodes coupled to the communications controller, and the mapping unit provides a mapping of user bearers to radio bearers.

18 Claims, 6 Drawing Sheets

Related U.S. Application Data (60) Provisional application No. 61/306,746, filed on Feb. 22, 2010.

(51) Int. Cl.
| | | |
|---|---|---|
| *H04W 12/08* | (2009.01) | |
| *H04W 72/08* | (2009.01) | |
| *H04W 76/15* | (2018.01) | |
| *H04W 76/12* | (2018.01) | |
| *H04B 7/26* | (2006.01) | |
| *H04W 84/04* | (2009.01) | |
| *H04W 92/04* | (2009.01) | |

(52) U.S. Cl.
CPC ............ *H04W 76/12* (2018.02); *H04W 76/15* (2018.02); *H04B 7/2606* (2013.01); *H04W 84/047* (2013.01); *H04W 92/045* (2013.01)

(56) References Cited

U.S. PATENT DOCUMENTS

| | | | |
|---|---|---|---|
| 2004/0116120 | A1 | 6/2004 | Gallagher et al. |
| 2004/0162871 | A1 | 8/2004 | Pabla et al. |
| 2004/0176129 | A1* | 9/2004 | Menon ................. G06Q 10/087 455/554.1 |
| 2004/0228313 | A1 | 11/2004 | Cheng et al. |
| 2005/0014464 | A1 | 1/2005 | Larsson |
| 2007/0049210 | A1 | 3/2007 | Usuda et al. |
| 2007/0206537 | A1 | 9/2007 | Cam-Winget et al. |
| 2008/0075059 | A1 | 3/2008 | Kermoal et al. |
| 2008/0107076 | A1 | 5/2008 | Ramachandran et al. |
| 2008/0117855 | A1 | 5/2008 | Choi et al. |
| 2009/0074189 | A1 | 3/2009 | Ryu et al. |
| 2009/0104907 | A1 | 4/2009 | Otting et al. |
| 2009/0129342 | A1 | 5/2009 | Hwang et al. |
| 2010/0202322 | A1* | 8/2010 | Cai ..................... H04W 76/068 370/254 |
| 2010/0235620 | A1* | 9/2010 | Nylander ................. H04L 63/20 713/151 |
| 2010/0246533 | A1 | 9/2010 | Lundin et al. |
| 2010/0260096 | A1 | 10/2010 | Ulupinar et al. |
| 2010/0272006 | A1* | 10/2010 | Bertrand ............... H04B 7/2606 370/315 |
| 2011/0002304 | A1* | 1/2011 | Lee ....................... H04W 36/02 370/331 |
| 2011/0134826 | A1 | 6/2011 | Yang et al. |
| 2011/0199927 | A1 | 8/2011 | Frost et al. |
| 2011/0228720 | A1 | 9/2011 | Ninagawa et al. |
| 2011/0235514 | A1* | 9/2011 | Huang ................ H04B 7/15528 370/235 |
| 2012/0020278 | A1* | 1/2012 | Moberg ................ H04B 7/155 370/315 |
| 2012/0087300 | A1 | 4/2012 | Seok |
| 2012/0092994 | A1* | 4/2012 | Wang ................... H04L 45/302 370/235 |
| 2012/0294226 | A1* | 11/2012 | Racz ..................... H04B 7/155 370/315 |
| 2013/0143574 | A1* | 6/2013 | Teyeb ............... H04W 36/0011 455/438 |
| 2015/0156663 | A1* | 6/2015 | Wang ................... H04L 45/302 370/235 |

FOREIGN PATENT DOCUMENTS

| | | |
|---|---|---|
| CN | 101651950 A | 2/2010 |
| RU | 2342800 C2 | 12/2008 |
| RU | 2349046 C2 | 3/2009 |

OTHER PUBLICATIONS

NEC: "Common Radio Bearer Configuration for Un Interface," 3GPP TSG-RAN WG2 Meeting #65, R3-091957, Aug. 24-28, 2009, 4 pages, Shenzen, China.

Huawei, "Type 1 Relay Architecture Consideration," 3GPP TSG RAN WG2 #66, R2-093106, Nat 4-8, 2009, pp. 1-7, San Francisco.

\* cited by examiner

SYSTEM AND METHOD FOR COMMUNICATIONS IN COMMUNICATIONS SYSTEMS WITH RELAY NODES

This application is a continuation of U.S. Non-provisional application Ser. No. 12/964,234, filed on Dec. 9, 2010, entitled "System and Method for Communications in Communications Systems with Relay Nodes", which claims the benefit of U.S. Provisional Application No. 61/306,746, filed on Feb. 22, 2010, entitled "Multiple Relay Architecture Models to Suitable to Operators' Various Deployment Scenarios and Phased Deployment", which applications are hereby incorporated herein by reference.

TECHNICAL FIELD

The present invention relates generally to wireless communications, and more particularly to a system and method for communications in communications systems with relay nodes.

BACKGROUND

Generally, a relay node (RN) is considered as a tool to improve, e.g., the coverage of high data rates, group mobility, temporary network deployment, the cell-edge throughput and/or to provide coverage in new areas, the performance of a communications system. The RN is wirelessly connected to a communications system via a donor cell (also referred to as a donor enhanced Node B (donor eNB or DeNB)). The RN may serve as an eNB to one or more user equipment (UE). Generically, an eNB may also be referred to as a base station, access point, controller, and so on, and a UE may also be referred to as a mobile station, access terminal, subscriber, user, communications device, and so forth.

To a UE that is being served by the RN, the RN may appear identical to an eNB, scheduling uplink (UL) and downlink (DL) transmissions to the UE over an access link, which is between the RN and the UE. When a UE is served by more than one RN, cooperative multipoint transmission/reception (CoMP) or other advanced transmission techniques may be used by the multiple RNs to help provide cooperative gain and improve the performance of the UE.

SUMMARY OF THE INVENTION

These and other problems are generally solved or circumvented, and technical advantages are generally achieved, by preferred embodiments of the present invention which provide a system and method for communications in communications systems with relay nodes.

In accordance with a preferred embodiment of the present invention, a communications controller is provided. The communications controller includes a communications control unit, a bearer control unit coupled to the communications control unit, and a mapping unit coupled to the bearer control unit. The communications control unit manages resources and to schedule transmission opportunities, the bearer control unit manages radio bearers for relay nodes coupled to the communications controller, and the mapping unit provides a mapping of user bearers to radio bearers.

In accordance with another preferred embodiment of the present invention, a communications network is provided. The communications network includes at least one communications controller, and a core network coupled to the at least one communications controller. The at least one communications controller manages resources, schedules transmission opportunities, manages radio bearers for relay nodes coupled to the at least one communications controller, and provides a mapping of user bearers to radio bearers. The core network manages communications devices coupled to the core network and manages relay nodes coupled to the core network.

In accordance with another preferred embodiment of the present invention, a method for configuring a connection is provided. The method includes determining a quality of service (QoS) class of a connection, determining a security level of the connection, and setting a termination for an interface of a connection between a core network and a user of a communications system. The setting is based on the QoS class and the security level, and the interface comprises an interface to the core network of the communications system.

In accordance with another preferred embodiment of the present invention, a method for managing resources of a communications system is provided. The method includes determining a quality of service (QoS) type of a connection, and setting a mapping of user bearers to radio bearers for relay nodes of the communications system based on the QoS type of the connection.

An advantage of an embodiment is that a flexible architecture is provided to allow an operator of a communications system to provide differing levels of performance for the communications system. For example, high levels of security may be provided. Alternatively, high performance or meeting tight quality of service (QoS) restrictions may be provided. Furthermore, a combination of one or more of the above may be provided.

A further advantage of an embodiment is that simple modifications to existing communications system entities are utilized to simplify implementation and deployment of the embodiments without incurring significant costs.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership (3GPP) Long Term Evolution (LTE) compliant communications system. The invention may also be applied, however, to other communications systems, such as those compliant to the WiMAX technical standards. Additionally, the invention may also be applied to any of a variety of heterogeneous communications systems.

Figure 1:
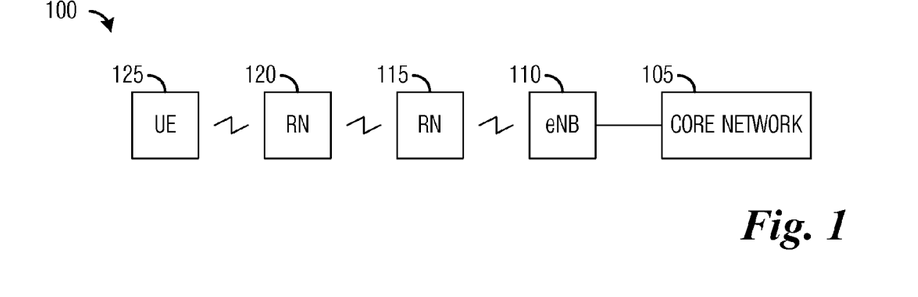
FIG. 1 is a diagram of a communications system.

FIG. 1 illustrates a communications system 100. Communications system 100 may be configured as a wireless relay system and includes a core network 105 that may serve as a central part of a communications network and provides various services to customers connected to communications system 100. Elements of core network 105 may include mobility management entity (MME), serving gateway (SGW), packet data network gateway (PGW), and so forth. Communications system 100 also includes one or more eNBs, such as eNB 110, connected to core network 105 over wireline(s). As discussed previously, an eNB may serve as a communications controller for UE operating within its coverage area. An eNB may be referred to as a DeNB if it is donating a portion of its bandwidth (i.e., radio network resources or resource blocks) to provide a wireless backhaul link to RNs operating in its coverage area.

Communications system 100 may also include one or more RNs, such as RN 115 and RN 120. A RN may either relay communications to another RN, such as RN 115, or a RN may relay communications to a UE, such as RN 120. A RN that relays communications to a UE may be referred to as a serving RN. Communications system 100 may also include one or more UEs, such as UE 125. The eNBs, RNs, and UEs may make up an evolved universal terrestrial radio access network (E-UTRAN), with the eNBs serving as interface between core network 105 and the E-UTRAN.

Typically, a wireless relay system (such as communications system 100) may have a variety of application and/or deployment scenarios, each with potentially different security, QoS, and performance requirements. For example, in a simple coverage extension scenario, overhead and performance may be critical requirements, but security may also be important. While, in an in-door capacity enhancement scenario, performance (e.g., reduced overhead) may be critical but security may not be as important since RNs may be deployed in relatively secured locations.

Figure 2A:
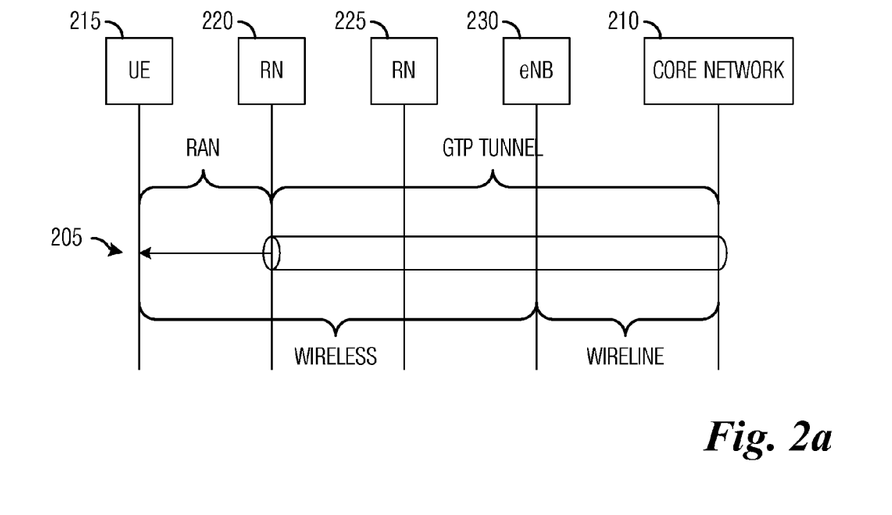
FIG. 2a is a diagram of a connection between a core network and a UE, wherein security may be a critical criterion.

FIG. 2a illustrates a connection 205 between a core network 210 and a UE 215, wherein security may be a critical criterion. In order to provide high levels of security, a strong security protocol, such as IPsec, should be used for as long as possible. In connection 205, a general packet radio service (GPRS) tunneling protocol (GTP) tunnel is established between core network 210 and serving RN 220 and encompasses RN 225 and eNB 230. A final wireless hop between serving RN 220 and UE 210 may be made over a radio access network (RAN) based security protocol. By terminating the GTP tunnel at serving RN 220, at least a significant part of the E-UTRAN (wireless) portion of the communications system may be secured by IPsec, for example, alone or on top of Layer 2 security.

Figure 2B:
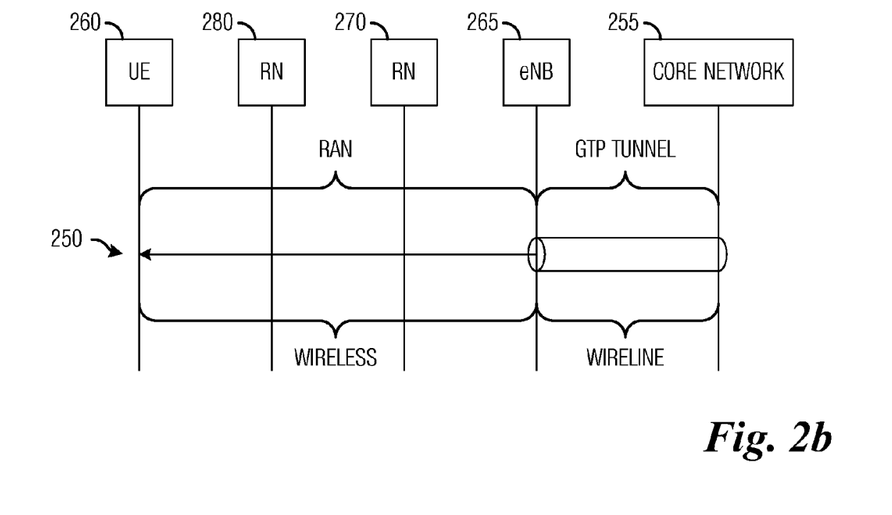
FIG. 2b is a diagram of a connection between a core network and a UE, wherein performance may be a critical criterion.

FIG. 2b illustrates a connection 250 between a core network 255 and a UE 260, wherein performance may be a critical criterion. Typically, in order to provide high performance in a connection with a wireless component, overhead (especially in the wireless portion) must be reduced. In connection 250, a GTP tunnel is terminated at eNB 265, therefore, overhead typically associated with GTP/IP protocols may be reduced in a wireless portion of the communications system where bandwidth may be limited. Communications occurring over part of connection 250 over the wireless (E-UTRAN) portion of the communications system may therefore proceed without incurring IP security protocol overhead. For security protection, either using IPsec or Layer 2 security should be configured based on deployment scenario and per UE or application requirement.

Figure 3:
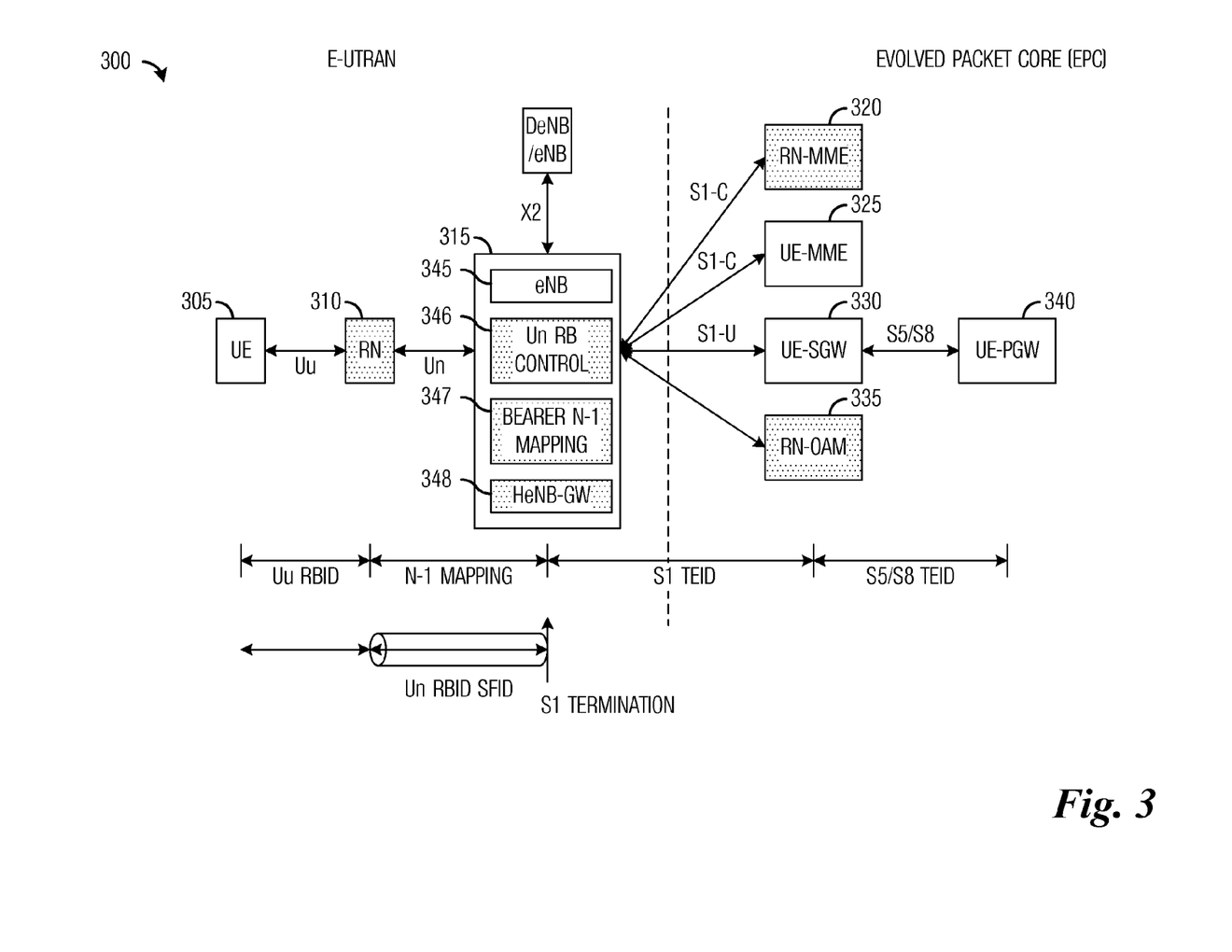
FIG. 3 is a diagram of a communications system with enhancements to various network components to improve performance at low cost.

FIG. 3 illustrates a communications system 300 with enhancements to various network components to improve performance at low cost. As shown in FIG. 3, communications system 300 includes modifications to core network (shown in FIG. 3 as an evolved packet core (EPC)) and E-UTRAN components to improve performance while minimizing impact on cost. In order to minimize cost, restrictions may be enforced on communications system 300. Examples of restrictions may include two hop communications (single RN in a single connection), fixed RN installation, and so forth. Communications system 300 may be capable of providing communications with low handover overhead, simple QoS support, and typical security requirements. Design criteria for communications system 300 include coverage extension and capacity with backhaul overhead also being a criterion.

The description of communications system 300 is based on a description of a single connection from a UE to the EPC. Connections between other UEs to the EPC may or may not share some of the components discussed herein. Communications system 300 includes a UE 305 connected wirelessly to a RN 310 (a wireless interface between UE 305 and RN 310 may be referred to as a Uu interface) that is wirelessly connected to a DeNB 315 (a wireless interface between RN 310 and DeNB 315 may be referred to as a Un interface). If multiple RNs are supported in a single connection, then wireless interfaces between the individual RNs may also be referred to as Un interfaces.

DeNB 315 may be connected over a wireline to the EPC. Specifically, DeNB 315 may be connected to a RN mobility management entity (RN-MME) 320, a UE-MME 325, a UE-SGW 330 (which is further connected to UE-PGW 340), and a RN Operation, Administration, and Maintenance entity (RN-OAM) 335. UE-MME 325 may be used to manage mobility of UE 305, for example, for handover purposes. UE-SGW 330 may be used to route and forward packets to and from UE 305. UE-SGW 330 may also serve as an anchor for the user plane during handovers. UE-PGW 340 may be used to connect UE 305 to external packet networks (packet networks that are not part of communications system 300). UE-MME 325, UE-SGW 330, and UE-PGW 340 may be as specified in the 3GPP LTE technical standards without modification.

However, addition of RN-MME 320 and RN-OAM 335 may be necessary. RN-MME 320 may be used to perform RN authentication and may manage default RN bearer for RN's control plane, while RN-OAM 335 may perform RN Internet Protocol (IP) address management as well as other OAM functions. The addition of RN-MME 320 and RN-OAM 335, however, may have no impact on existing EPC components and compatibility with earlier UEs is maintained.

DeNB 315 may also require modifications. In addition to providing eNB functionality (eNB unit 345). eNB functionality may include network resource management, transmission opportunity scheduling, data stream processing, routing, transmission request processing, and so on. DeNB 315 may also provide Un radio bearer (RB) control (Un RB control unit 346) that enables Un RB establishment/reestablishment/cancellation for each RN as well as RN bearer establishment/reestablishment/cancellation at evolved packet system (EPS) for UE 305 bearer establishment/reestablishment/cancellation when needed. DeNB 315 may fully control the Un RB model and Un RBs may be defined for RN 310 with eight RBs being a preferred number. Furthermore, DeNB 315 may provide UE attachment to RN or DeNB by mapping a relationship between S1 tunnel endpoint identifier (TEID) and Un radio bearer identifier (RBID)/local service flow identifier (SFID), where S1 is an interface for connecting devices to the EPC; UE EPS bearer mapping (bearer N-1 mapping unit 347) to provide N to 1 mapping for QoS purposes (per QoS basis with multiple UE EPS bearers with similar QoS, where N is an integer value and represents a number of connections (e.g., QoS class identifier or some other class identifier) mapped to one Un RB or per UE EPS ID on Un bearer with shorter/local UE SFID inserted in a packet data convergence protocol (PDCP) packet data unit (PDU)); and home eNB (HeNB) GW performing (HeNB-GW 348) to concentrate S1/X2 traffic. HeNB-GW 348 may optionally be placed outside of DeNB 315.

According to an alternative embodiment, HeNB-GW 348 may be an alternate network GW that may serve as a traffic concentrator for an alternate network, such as a pico-cell network, a home Femto-cell network, another relay network, a heterogeneous network, a low power network, or so on.

Security may be provided with RN authentication utilizing the same mechanism used for UE authentication, universal subscriber identity module (USIM) authentication, while UE data security may be provided using PDCP to handle Un security. QoS may be provided by combining allocation and retention priority (ARP) and QCI. In a typical configuration, five Un data RBs (DRBs) may be sufficient in addition to three signal radio bearers (SRBs), one of which may be dedicated for RN-OAM use.

Figure 4:
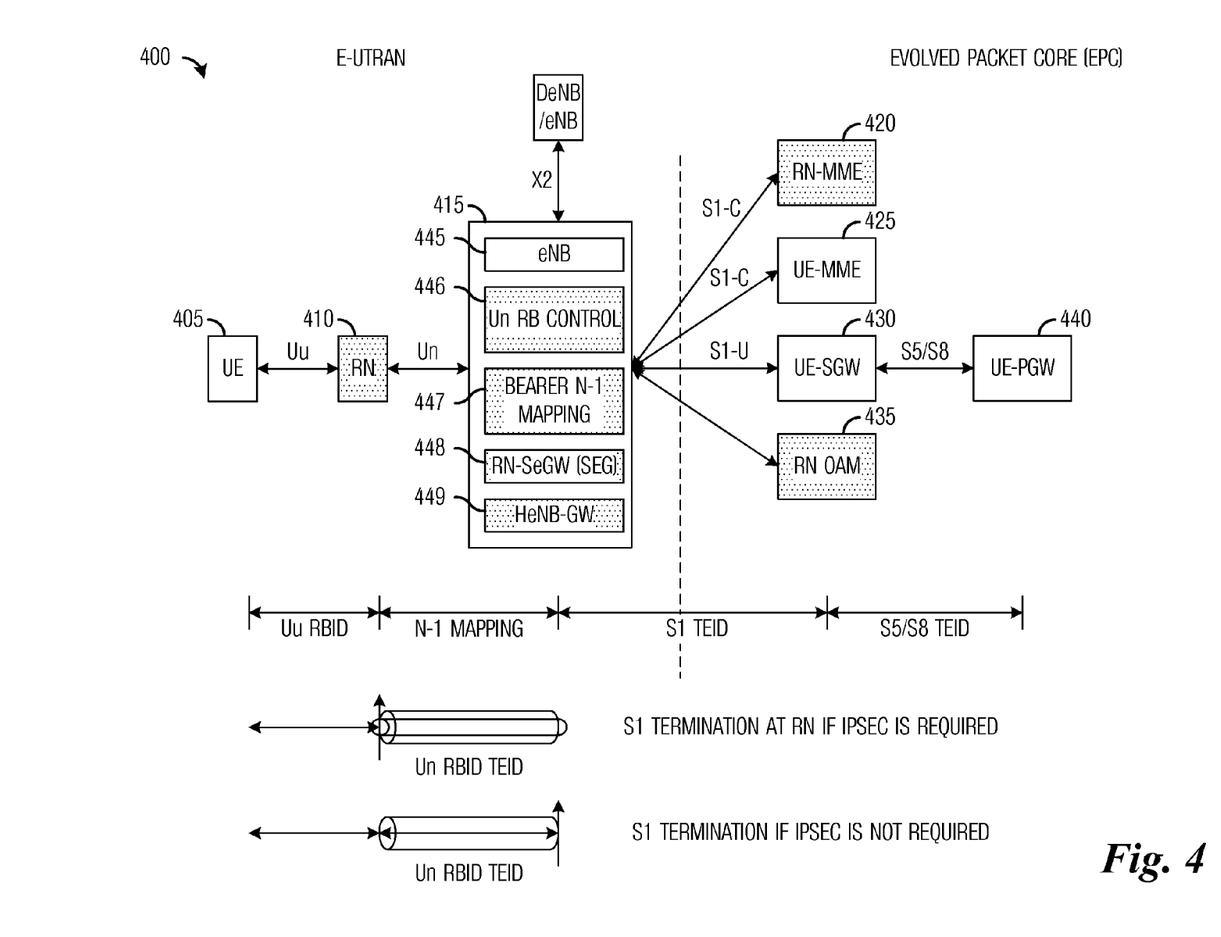
FIG. 4 is a diagram of a communications system with enhancements to various network components to strengthen security.

FIG. 4 illustrates a communications system 400 with enhancements to various network components to strengthen security. As shown in FIG. 4, communications system 400 includes modifications to EPC and E-UTRAN components to provide strengthened security. In order to strengthen security, restrictions may be enforced on communications system 400. Examples of restrictions may include two hop communications, fixed RN installation, and so forth. Communications system 400 may be capable of providing communications with good coverage (low handover overhead is not a concern) with low QoS requirements. However, security requirements may be high, for example, RNs may be in an unsecured location or RNs may connect to the EPC through an unsecured third party network.

Communications system 400 includes a UE 405 connected wirelessly to a RN 410 that is wirelessly connected to a DeNB 415. DeNB 415 may be connected over a wireline to the EPC. Specifically, DeNB 415 may be connected to a RN-MME 420, a UE-MME 425, a UE-SGW 430 (which is further connected to UE-PGW 440), and a RN-OAM 435. UE-MME 425 may be used to manage mobility of UE 405, for example, for handover purposes. UE-SGW 430 may be used to route and forward packets to and from UE 405. UE-SGW 430 may also serve as an anchor for the user plane during handovers. UE-PGW 440 may be used to connect UE 405 to external packet networks (packet networks that are not part of communications system 400). UE-MME 425, UE-SGW 430, and UE-PGW 440 may be as specified in the 3GPP LTE technical standards without modification.

However, addition of RN-MME 420 and RN-OAM 435 may be necessary. RN-MME 420 may be used to perform RN authentication (if USIM is needed), while RN-OAM 435 may perform RN IP address management (if not locally assigned by DeNB 415) as well as other OAM functions. The addition of RN-MME 420 and RN-OAM 435, however, may have no impact on existing EPC components and compatibility with earlier UEs is maintained.

DeNB 415 may also require modifications. In addition to providing eNB functionality (eNB unit 445), DeNB 415 may also provide Un RB control (Un RB control unit 446) that enables Un RB establishment/reestablishment/cancellation for each RN. DeNB 415 may fully control the Un RB model and Un RBs may be defined for RN 410 with eight RBs being a preferred number. Furthermore, DeNB 415 may provide UE attachment to RN 410 or DeNB 415 by mapping a relationship between S1 TEID and UN RBID/local SFID; UE EPS bearer mapping (bearer N-1 mapping unit 447) to provide N to 1 mapping for QoS purposes (per QoS basis with multiple UE EPS bearers with similar QoS (e.g., QoS class identifier or some other class identifier) mapped to one Un RB or per UE EPS ID on Un bearer with shorter/local UE SFID inserted in a PDCP PDU if S1 interface terminates at DeNB 415 and with TEID in a GTP tunnel if S1 interface terminates at RN 410); GTP tunnel management to provide local GTP tunnel (from DeNB 415 to RN 410 of UE 405) if S1 interface terminates at RN 410; RN-SeGW 448 may be used to provide security for RNs; and stream control transmission protocol (SCTP) management (HeNB-GW 449) for UE S1-C and RN X2-C interfaces. HeNB-GW 449 may manage the SCTP instance(s) for each RN for UE S1-C interface and for each RN for RN X2-C interface.

According to an alternative embodiment, HeNB-GW 449 may be an alternate network GW that may serve as a traffic concentrator for an alternate network, such as a pico-cell network, a home Femto-cell network, another relay network, a heterogeneous network, a low power network, or so on.

Security in communications system 500 may be strengthened with RN authentication using the same technique used for eNB authentication (e.g., certificate based and mutual authentication), also secured gateway (RN-SeGW 448, for example) may be implemented. Security for data of UE 405 may be provided by reusing IPsec or Layer 2 security techniques.

S1 interface termination may take place at DeNB 415 if IPsec is not required, while S1 interface termination may take place at RN 410 if IPsec is required. Additionally, if the S1 interface is terminated at RN 410, a local UE GTP tunnel may be established from DeNB 415 to RN 410 and managed by DeNB 415.

QoS may be provided by combining ARP and QCI. In a typical configuration, five Un DRBs may be sufficient in addition to three SRBs.

Figure 5:
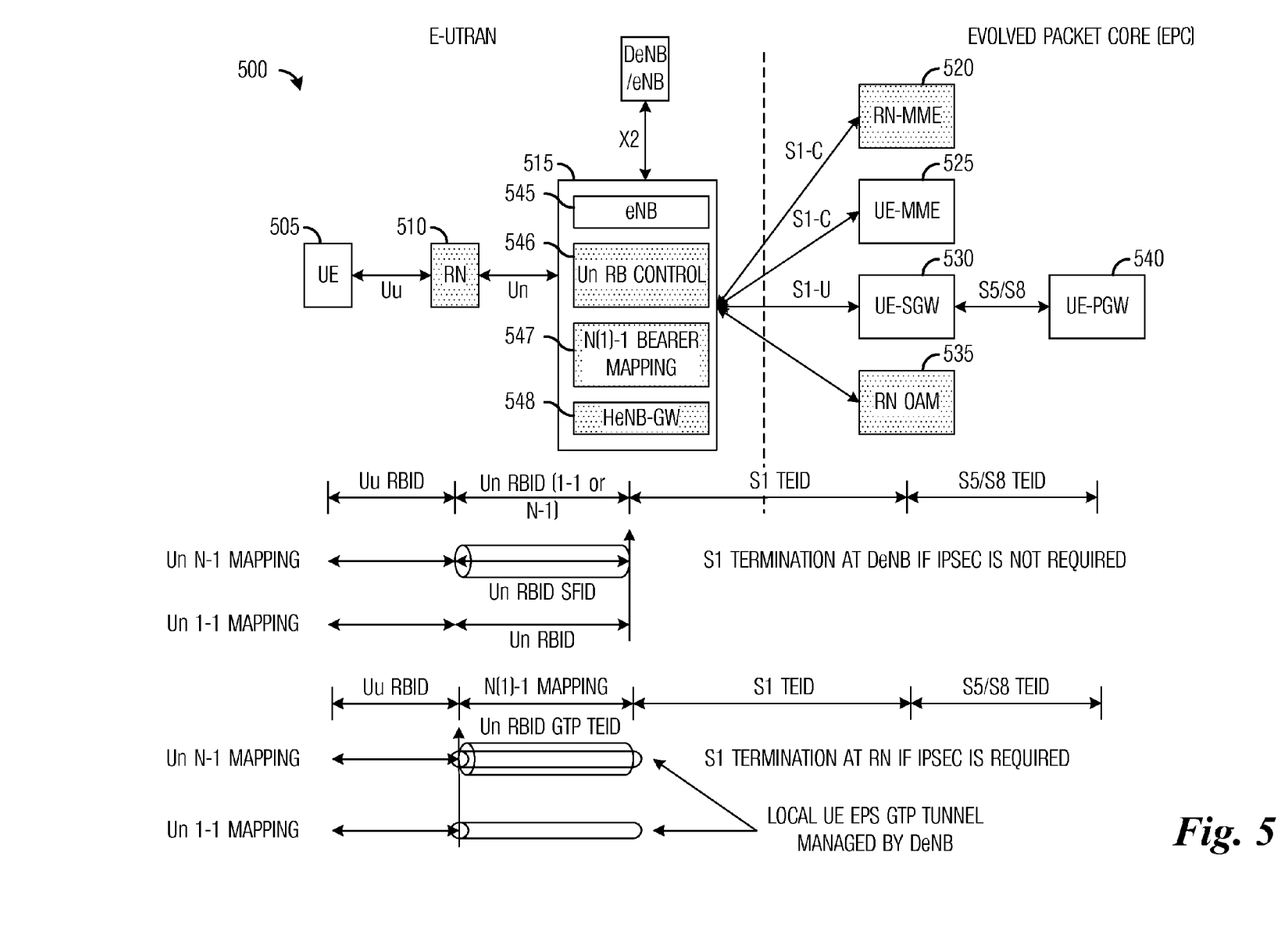
FIG. 5 is a diagram of a communications system with enhancements to various network components to strengthen QoS performance.

FIG. 5 illustrates a communications system 500 with enhancements to various network components to strengthen QoS performance. As shown in FIG. 5, communications system 500 includes modifications to EPC and E-UTRAN components to provide strengthened QoS performance. In order to strengthen QoS performance, restrictions may be enforced on communications system 500. Examples of restrictions may include two hop communications, fixed RN installation, and so forth. Communications system 500 may be capable of providing communications with low UE handover overhead with normal security requirements, such as RNs being located in secured places. Coverage may remain a high concern topic with backhaul overhead being another topic of concern. QoS requirements may be high, i.e., high QoS class granularity.

Communications system 500 includes a UE 505 connected wirelessly to a RN 510 that is wirelessly connected to a DeNB 515. DeNB 515 may be connected over a wireline to the EPC. Specifically, DeNB 515 may be connected to a RN-MME 520, a UE-MME 525, a UE-SGW 530 (which is further connected to UE-PGW 540), and a RN-OAM 535. UE-MME 525 may be used to manage mobility of UE 505, for example, for handover purposes. UE-SGW 530 may be used to route and forward packets to and from UE 505. UE-SGW 530 may also serve as an anchor for the user plane during handovers. UE-PGW 540 may be used to connect UE 505 to external packet networks (packet networks that are not part of communications system 500). UE-MME 525, UE-SGW 530, and UE-PGW 540 may be as specified in the 3GPP LTE technical standards without modification.

However, addition of RN-MME 520 and RN-OAM 535 may be necessary. RN-MME 520 may be used to perform RN authentication (using USIM), while RN-OAM 535 may perform RN IP address management (if not locally assigned by DeNB 515) as well as other OAM functions. The addition of RN-MME 520 and RN-OAM 535, however, may have no impact on existing EPC components and compatibility with earlier UEs is maintained.

DeNB 515 may also require modifications. In addition to providing eNB functionality (eNB unit 545), DeNB 515 may also provide Un RB control (Un RB control unit 546) that enables Un RB establishment/reestablishment/cancellation for each RN as well as Un RB establishment/reestablishment/cancellation for selected UE EPS bearers. DeNB 515 may fully control the Un RB model and Un RB assignment may be assigned to each RN and/or to each UE EPS bearer. Furthermore, DeNB 515 may provide UE attachment to RN 410 or DeNB 415 by mapping a relationship between S1 TEID and UN RBID/local SFID if S1 interface terminates at DeNB 515 or mapping a relationship between S1 TEID and Un RBID/local TEID if S1 interface terminates at RN 510; UE EPS bearer mapping (bearer N(1)-1 mapping unit 547) to provide N-1 (i.e. N-to-1) or 1-1 (i.e. 1-to-1) mapping for QoS purposes (per QoS mapping or per UE EPS mapping for selected UE EPS bearers); and HeNB-GW 548 (which may be optionally be placed outside of DeNB 515).

According to an alternative embodiment, HeNB-GW 548 may be an alternate network GW that may serve as a traffic concentrator for an alternate network, such as a pico network, a home network, another relay network, a heterogeneous network, a low power network, or so on.

QoS class granularity may be enhanced by increasing a number of media access control (MAC) logical channel identifier (LCID) bits (for example, from five bits to 13 bits). UE EPS bearer mapping to Un bearer may be configurable as N-1 or 1-1 mappings and may be performed on a per QoS basis with multiple UE EPS bearers with similar QoS (QCI) mapped to one Un RB or UE EPS identification on Un bearer with shorter/local UE SFID inserted in PDCP PDU or TEID in GTP tunnel. The mappings may also be performed on a per UE EPS bearer mapping.

GTP tunnel and SCTP management may be as described for communications system 400, while security may be as described for communications system 300 or communications system 400.

Figure 6:
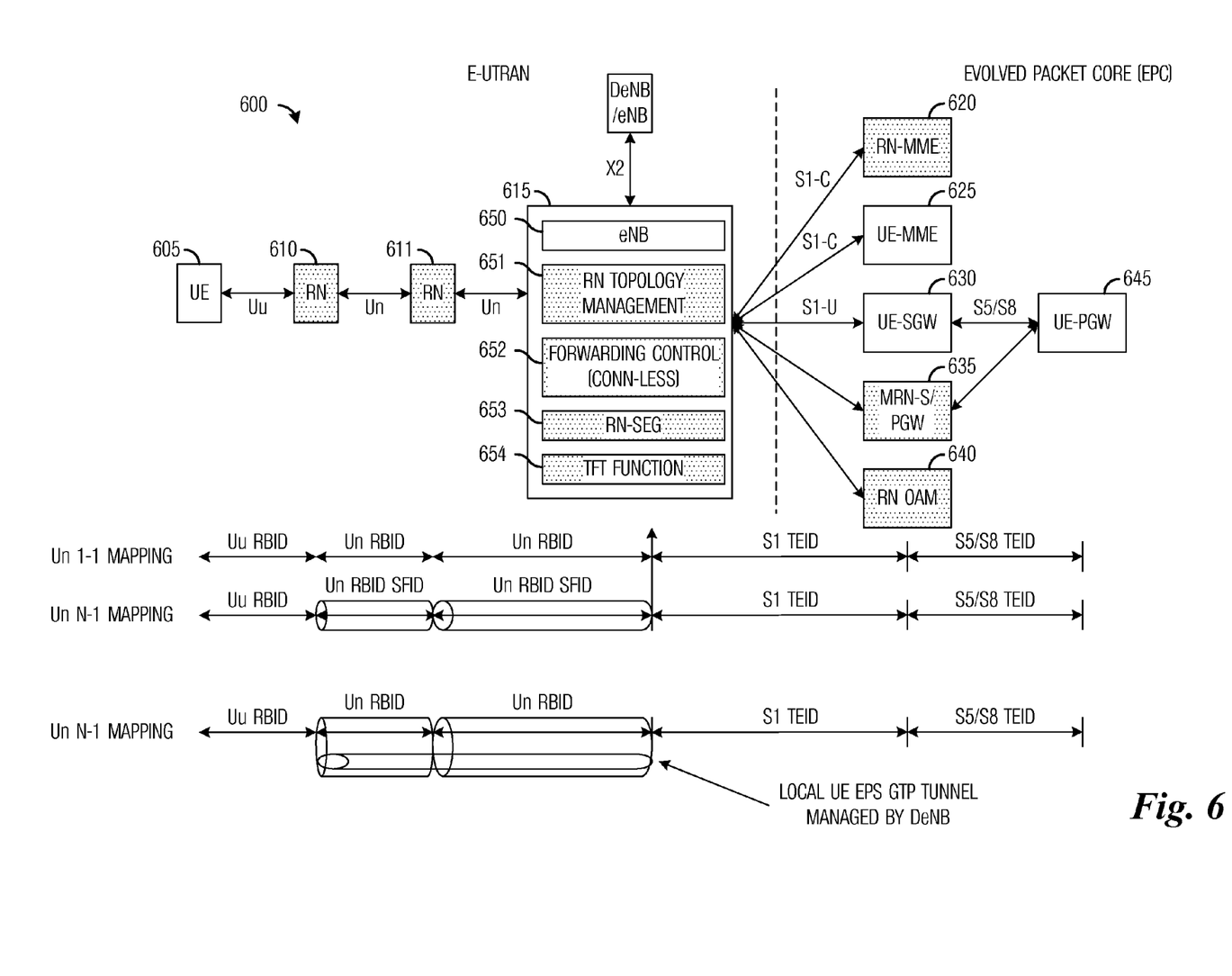
FIG. 6 is a diagram of a communications system with enhancements to various network components to enable a strengthening of security and/or QoS performance to meet requirements.

FIG. 6 illustrates a communications system 600 with enhancements to various network components to enable a strengthening of security and/or QoS performance to meet requirements. As shown in FIG. 6, communications system 600 includes modifications to EPC and E-UTRAN components to provide deployment flexibility (e.g., strengthened security and/or QoS performance) to meet requirements. In order to provide deployment flexibility, restrictions may be enforced on communications system 600. Examples of restrictions may include two or more hop communications (i.e., a connection may include one or more RNs), fixed or mobile RNs (i.e., dynamic topology), and so on. Communications system 600 may be capable of providing communications with any level (low, medium, or high) of UE handover overhead with high security requirements and/or high QoS requirements. Coverage and/or system capacity may be main topics of concern with backhaul overhead also being another topic of concern. Furthermore, in communications system 600, a DeNB may anchor UE handovers or anchor peer-to-peer communications.

Communications system 600 includes a UE 605 connected wirelessly to a RN 610 (a serving RN) that is wirelessly connected to a RN 611 that is wirelessly connected to a DeNB 615. Although FIG. 6 illustrates a connection with two RNs, communications system 600 may be capable of supporting connections with any number of RNs, including zero, one, two, three, and so forth. DeNB 615 may be connected over a wireline to the EPC. Specifically, DeNB 615 may be connected to a RN-MME 620, a UE-MME 625, a UE-SGW 630 (which is further connected to UE-PGW 645), a mobile RN (MRN)-S/PGW 635, and a RN-OAM 640. UE-MME 625 may be used to manage mobility of UE 605, for example, for handover purposes. UE-SGW 630 may be used to route and forward packets to and from UE 605. UE-SGW 630 may also serve as an anchor for the user plane during handovers. UE-PGW 640 may be used to connect UE 605 to external packet networks (packet networks that are not part of communications system 600). UE-MME 625, UE-SGW 630, and UE-PGW 640 may be as specified in the 3GPP LTE technical standards without modification.

However, addition of RN-MME 620, MRN-S/PGW 635, and RN-OAM 640 may be necessary. RN-MME 620 may be used to perform RN mobility management across sub-nets managed by DeNB 615, MRN-S/PGW 635 may be used to perform as an optional traffic concentrator (for example, at a GTP tunnel or at an extra tunnel) of a mobile RN, while RN-OAM 640 may perform RN IP address management as well as other OAM functions. The addition of RN-MME 620, MRN-S/PGW 635, and RN-OAM 640, however, may have no impact on existing EPC components and compatibility with earlier UEs is maintained.

DeNB 615 may also require modifications. In addition to providing eNB functionality (eNB unit 650), DeNB 615 may also provide RN topology management (RN topology management unit 651) as well as UN bearer control, forwarding control for both connection oriented and connectionless based connections (forwarding control unit 652), SeG functionality (RN-SEG 653), traffic flow template (TFT) functionality (TFT function 654), optional HeNB GW like functionality (optional), static switching and/or dynamic routing, flow control, and so forth. Basically, DeNB 615 may provide functionality of DeNBs in communications systems 300, 400, and 500 in addition to RN topology management.

As discussed above, DeNB 615 may dynamically perform RN topology management. In a case of UE attachment to a RN or DeNB 615, DeNB 615 may perform RN intra subnet mobility management and/or RN inter subnet mobility management depending on subnet configuration, similarly in a case of RN attachment to a RN or DeNB 615, DeNB 615 may perform RN intra subnet mobility management and/or RN inter subnet mobility management depending on subnet configuration.

For QoS purposes, both QoS class (QCI, for example) and path information (e.g., destination RN for downlink connections) may be used for scheduling at DeNBs and RN. Additionally, both QoS class and path information may be used for N-1 mapping.

Communications system 600 may be capable of providing both connection oriented connections for fixed network and/or fixed UE configurations, as well as connectionless connectivity for dynamic topology networks. For a fixed topology system (fixed RN and low UE mobility, for example) connection oriented data forwarding may be implemented with Un/Uu RBID switching. For a dynamic topology system (RN mobility and high UE mobility, for example) connectionless oriented data forwarding may be implemented with IP routing. A hybrid system may also be implemented where for moving RNs and high mobility UEs, connectionless oriented data forwarding may be used, while for fixed RNs and UEs with low mobility, connection oriented data forwarding may be used.

Advantages of providing connection oriented and/or connectionless oriented data forwarding may include efficient utilization of radio resources by reducing possible overhead caused by GTP tunnels when one is not needed and reduced signaling overhead caused by connection management (per hop link RB setup/release) when it may be possible to avoid it.

Furthermore, Un RB management and/or assignment may also be performed based on security requirements, desired performance, and so on. In general, Un RBs may include multiple RN RBs with each associated with an operator defined QoS class. There may be multiple per UE service RBs. For a guaranteed bit rate (GBR) service, in order to better control QoS performance, a unique Un bearer may be assigned to each GBR service per UE service bearer, thereby providing a 1-1 mapping service. For non-GBR service, service flows with similar QoS class may be mapped to corresponding RN Un RBs, thereby providing a N-1 mapping service.

Advantages of dynamic Un RB management and/or assignment may include: Un 1-1 mapping of UE GBR EPS bearers (or equivalent service requiring tight QoS control) enables better QoS performance control; for non-GBR EPS bearers (or equivalent service requiring relative loose QoS control), radio bearer establishment/update across multiple hops may be avoided during UE handover and only end-to-end GTP tunnel establishment/cancellation is required; and for GBR bearers, radio bearers across multiple hops need to be updated as a requirement, therefore 1-1 mapping is not incurring anymore overhead.

Figure 7:
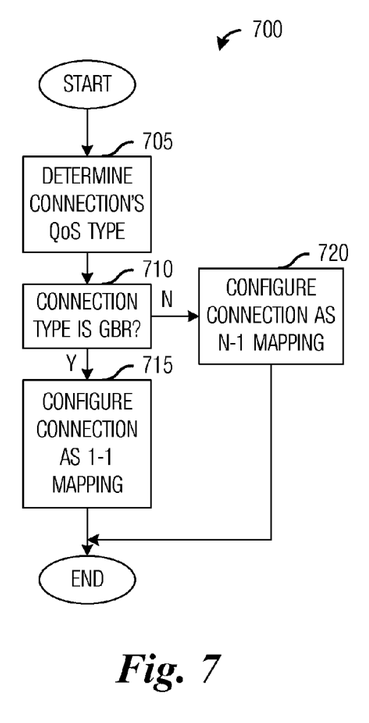
FIG. 7 is a flow diagram of operations for Un RB management.

FIG. 7 illustrates a flow diagram of operations 700 for Un RB management. Operations 700 may be indicative of operations occurring in a DeNB, such as DeNB 615, as the DeNB manages RBs for Un wireless interfaces for connections that involve the DeNB. Operations 700 may occur while the DeNB is in a normal operating mode. According to an embodiment, operations 700 may occur in a DeNB of a connection who's Un RBs are being managed. According to an alternative embodiment, operations 700 may occur in a specified DeNB (or some other entity) designated to manage Un RBs for all connections in a communications system.

Operations 700 may begin with the DeNB (or the specified DeNB or other entity) determining a QoS type of a connection (block 705). As an example, a QoS type of a connection may be GBR or non-GBR. However, a connection may have other types, including different GBR levels, and so on. The DeNB may then select a Un RB mapping based on the QoS type of the connection.

As an example, if the DeNB may perform a check to determine if the QoS type of the connection is GBR (block 710). If the QoS type of the connection is GBR, then the DeNB may assign a unique Un bearer for the connection, i.e., configure the connection as a 1-1 mapping (block 715). As discussed previously, the assignment of a unique Un bearer to the connection on a per UE service bearer basis may allow for better control of QoS. According to an embodiment, if there are multiple GBR levels, then each of the different GBR levels may be assigned to different Un bearers. If the QoS type of the connection is non-GBR, then the DeNB may assign service flows with similar QoS class(es) to be mapped to corresponding RN Un RBs, i.e., configure the connection as a N-1 mapping (block 720). Operations 700 may then terminate.

As discussed previously, termination of S1 interface (e.g., at a DeNB or a RN) of a connection may vary depending upon security requirements, desired performance, and so forth. It may be possible to make a determination of where to terminate the S1 interface of a connection be on a connection by connection basis. For example, in an application with small packets and without an IPsec security requirement (i.e., low security requirements), the S1 interface may be terminated at a DeNB. If the S1 interface is terminated at a DeNB, then for Un QoS mapping, a UE EPS bearer may be identified by a local SFID (assigned by an associated DeNB) that is inserted into the PDCP PDU and security may be provided using Layer 2 security functions. In an application with large packets and with an IPsec security requirement, the S1 interface may be terminate at an RN (desirably, the serving RN) and a GTP tunnel with IPsec is used.

Dynamic selection of the termination of the S1 interface based on connection characteristics and requirements may be advantageous in reducing overhead for connections that do not require additional security or when packets in a connection are small and overhead may have a significant impact on performance. For example, for service with low security requirement or if the network itself is secure, IPsec may not be needed all the way to the RN and terminating the S1 interface at a DeNB may provide high backhaul efficiency, especially if small packets are involved.

Figure 8:
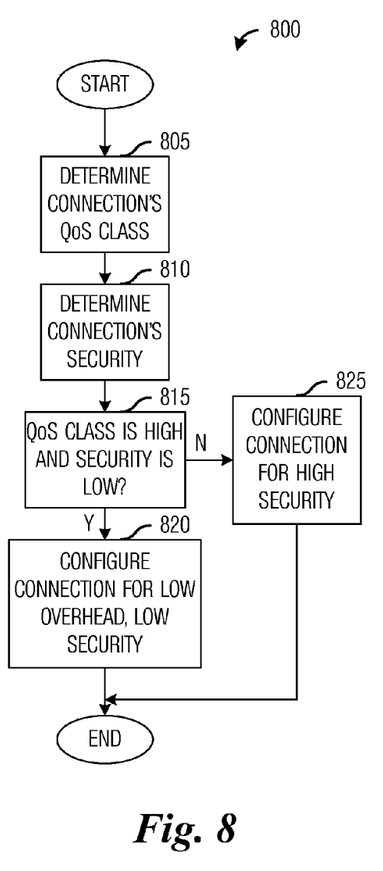
FIG. 8 is a flow diagram of operations for 51 termination determination.

FIG. 8 illustrates a flow diagram of operations 800 for S1 termination determination. Operations 800 may be indicative of operations occurring in a DeNB, such as DeNB 615, as the DeNB manages connections that involve the DeNB. Operations 800 may occur while the DeNB is in a normal operating mode. According to an embodiment, operations 800 may occur in a DeNB of a connection involving the DeNB. According to an alternative embodiment, operations 800 may occur in a specified DeNB (or some other entity) designated to manage connections in a communications system.

Operations 800 may begin with the DeNB determining a connection's QoS class (block 805). According to an embodiment, a connection's QoS class may specify information such as QoS restrictions (if any), and so forth. Additionally, the DeNB may determine the connection's security (block 810). As an example, a connection's security may specify a desired security level, security protocols to use, and so on. The DeNB may then determine the S1 interface's termination based on the connection's QoS class and its security.

The DeNB may perform a check to determine if the QoS class is high (meaning that the connection has strict QoS requirements) and if its security is low (meaning that non-stringent security measures may be employed) (block 815). If the QoS class is high, then the DeNB may set the S1 interface termination as early as possible, e.g., at the DeNB or at an end of a wireline connectivity, to provide low overhead and low security (block 820). By terminating the S1 interface as early as possible, security protocol overhead over wireless portions of the connection may be reduced. Reducing overhead over the wireless portions of the connection may help to improve performance since bandwidth may typically be limited over wireless connections, unlike with wireline connections. Furthermore, utilizing low security also helps to reduce the security protocol overhead.

If the QoS class is not high or if the security is high, then the DeNB may set the S1 interface termination as late as possible, e.g., at the serving RN of the connection (block 825). By setting the S1 interface termination as late as possible, maximum security may be provided for as much of the connection as possible, thereby maximizing the security of the connection. Operations 800 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for configuring a connection between a core network and a user equipment (UE) in a communication system, the method comprising:

configuring at least one radio bearer for at least one relay node coupled to a base station on the connection, wherein configuring the at least one radio bearer comprises mapping at least one backhaul bearer to the at least one radio bearer, and wherein the connection comprises a first interface extending from the core network to an end-point location and a second interface extending from the end-point location to the UE; and setting the end-point location in accordance with a requirement of the connection, wherein the end-point location is at the base station such that the first interface of the connection extends from the core network to the base station when the requirement of the connection satisfies a first network criterion, wherein the end-point location is at a relay node such that the first interface of the connection extends from the core network to the relay node when the requirement of the connection satisfies a second network criterion, wherein the requirement of the connection comprises at least one of an operator controllable quality of service (QoS) class requirement, a security level requirement, and a performance requirement, and wherein the setting the end-point location comprises:

setting the end-point location at the base station when the security level requirement does not exceed a threshold level of security, and setting the end-point location at the relay node when the security level requirement exceeds the threshold level of security.

2. The method of claim 1, wherein the security level requirement does not exceed the threshold level of security when the connection is not required to be secured by Internet Protocol Security (IPsec), and wherein the security level requirement exceeds the threshold level of security when the connection is required to be secured by IPsec.

3. The method of claim 1, wherein mapping the at least one backhaul bearer to the at least one radio bearer comprises mapping the backhaul bearer to the radio bearer in accordance with a QoS class of the backhaul bearer and radio bearer.

4. The method of claim 1 further comprising authorizing the relay node with a relay node security gateway or in association with a relay node mobility management entity.

5. The method of claim 1, wherein mapping the at least one backhaul bearer to the at least one radio bearer comprises mapping multiple backhaul bearers to one radio bearer, or mapping one backhaul bearers to one radio bearer.

6. The method of claim 1, wherein mapping the at least one backhaul bearer to the at least one radio bearer comprises mapping multiple backhaul bearers to a single radio bearer when the multiple backhaul bearers have a similar QoS class as the single radio bearer.

7. The method of claim 1, wherein the first interface and the second interface are of different interface types.

8. A base station, comprising:

a non-transitory memory; and a hardware processor configured to configure at least one radio bearer for at least one relay node coupled to the base station on a connection, wherein configuring the at least one radio bearer comprises mapping at least one backhaul bearer to the at least one radio bearer, and wherein the connection comprises a first interface extending from a core network to an end-point location and a second interface extending from the end-point location to a user equipment (UE); and set the end-point location in accordance with a requirement of the connection, wherein the end-point location is at the base station such that the first interface of the connection extends from the core network to the base station when the requirement of the connection satisfies a first network criterion, wherein the end-point location is at a relay node such that the first interface of the connection extends from the core network to the relay node when the requirement of the connection satisfies a second network criterion, wherein the requirement of the connection comprises at least one of an operator controllable quality of service (QoS) class requirement, a security level requirement, and a performance requirement, and wherein the hardware processor is configured to set the end-point location by:

setting the end-point location at the base station when the security level requirement does not exceed a threshold level of security, and setting the end-point location at the relay node when the security level requirement exceeds the threshold level of security.

9. The base station of claim 8, wherein the base station performs relay node authorization with a relay node security gateway or in association with a relay node mobility management entity.

10. The base station of claim 8, wherein the base station is configured to map multiple backhaul bearers to one radio bearer, or map one backhaul bearer to one radio bearer.

11. The base station of claim 10, wherein the base station is configured to map multiple backhaul bearers to a single radio bearer when the multiple backhaul bearers have a similar QoS class as the single radio bearer.

12. The base station of claim 8, wherein the security level requirement does not exceed the threshold level of security when the connection is not required to be secured by Internet Protocol Security (IPsec), and wherein the security level requirement exceeds the threshold level of security when the connection is required to be secured by IPsec.

13. A method for configuring a connection between a core network and a user equipment (UE) in a communication system, the method comprising:

configuring at least one radio bearer for a plurality of relay nodes coupled to a base station on the connection, wherein configuring the at least one radio bearer comprises mapping at least one backhaul bearer to the at least one radio bearer, and wherein the connection comprises a first interface extending from the core network to an end-point location and a second interface extending from the end-point location to the UE; and setting the end-point location in accordance with a requirement of the connection, wherein the end-point location is at the base station such that the first interface of the connection extends from the core network to the base station when the requirement of the connection satisfies a first network criterion, wherein the end-point location is at one of the plurality of the relay nodes such that the first interface of the connection extends from the core network to the relay node when the requirement of the connection satisfies a second network criterion, wherein the requirement of the connection comprises at least one of an operator controllable quality of service (QoS) class requirement, a security level requirement, and a performance requirement, and wherein the setting the end-point location comprises:

setting the end-point location at the base station when the security level requirement does not exceed a threshold level of security, and setting the end-point location at the relay node when the security level requirement exceeds the threshold level of security.

14. The method of claim 13, wherein the security level requirement does not exceed the threshold level of security when the connection is not required to be secured by Internet Protocol Security (IPsec), and wherein the security level requirement exceeds the threshold level of security when the connection is required to be secured by IPsec.

15. The method of claim 13, wherein mapping the at least one backhaul bearer to the at least one radio bearer comprises mapping the backhaul bearer to the radio bearer in accordance with a QoS class of the backhaul bearer and radio bearer.

16. The method of claim 13 further comprising authorizing those of the plurality of relay nodes between the end-point location and the core network with a relay node security gateway or in association with a relay node mobility management entity.

17. The method of claim 13, wherein mapping the at least one backhaul bearers to the at least one radio bearer comprises mapping multiple backhaul bearers to one radio bearer, or mapping one backhaul bearer to one radio bearer.

18. The method of claim 13, wherein mapping the at least one backhaul bearer to the at least one radio bearer comprises mapping multiple backhaul bearers to a single radio bearer when the multiple backhaul bearers have a similar QoS class as the single radio bearer.

* * * * *